(12) United States Patent
Winter et al.

(10) Patent No.: US 11,311,933 B2
(45) Date of Patent: Apr. 26, 2022

(54) METHOD AND PLANT FOR THE PRODUCTION OF A STARTING MATERIAL FOR THE PRODUCTION OF RARE EARTH MAGNETS

(71) Applicant: NETZSCH Trockenmahltechnik GmbH, Selb (DE)

(72) Inventors: Frank Winter, Wettenberg (DE); Wilhelm Fernengel, Kleinostheim (DE)

(73) Assignee: NETZSCH Trockenmahltechnik GmbH, Selb (DE)

( * ) Notice: Subject to any disclaimer, the term of this patent is extended or adjusted under 35 U.S.C. 154(b) by 89 days.

(21) Appl. No.: 16/413,875

(22) Filed: May 16, 2019

(65) Prior Publication Data

US 2019/0358703 A1    Nov. 28, 2019

(30) Foreign Application Priority Data

May 24, 2018   (DE) .......................... 102018112406.6

(51) Int. Cl.
*B22F 1/14*    (2022.01)
*B03C 1/30*    (2006.01)
(Continued)

(52) U.S. Cl.
CPC .................. *B22F 1/14* (2022.01); *B03C 1/30* (2013.01); *B22F 1/0007* (2013.01); *B22F 9/04* (2013.01);
(Continued)

(58) Field of Classification Search
CPC ........ B22F 1/0081; B22F 1/0007; B22F 9/04; B22F 2009/041; B22F 2998/10;
(Continued)

(56) References Cited

U.S. PATENT DOCUMENTS

2002/0129874 A1* 9/2002 Kaneko .................. B22F 9/008
                                                                148/301
2011/0025440 A1* 2/2011 Kuniyoshi .......... C22C 33/0278
                                                                335/302
(Continued)

FOREIGN PATENT DOCUMENTS

WO   2014033004 A1   3/2014
WO   2014154517 A1   10/2014
WO   2014205002 A2   12/2014

OTHER PUBLICATIONS

Somerlad et al. ("Dynamic classifiers improve pulverizer performance and more". Power. Jul. 15, 2007. (Year: 2007).*
(Continued)

*Primary Examiner* — Anthony J Zimmer
*Assistant Examiner* — Ricardo D Morales
(74) *Attorney, Agent, or Firm* — Whitmyer IP Group LLC

(57) ABSTRACT

A method and a plant for the production of a powdery starting material, which is provided for the manufacture of rare earth magnets, are disclosed. First of all, at least one magnetic material, which is comminuted into a powdery intermediate product with a possibly increased concentration of impurities, and/or at least one alloy including rare earth metal are provided, which includes a low concentration of impurities. A classification of the powdery intermediate product to at least one criterion takes place subsequently, wherein, for the classification of the powdery intermediate product with the increased concentration of impurities, at least one dynamic classifier is provided, which divides the powdery intermediate product with impurities into at least two fractions based on the at least one criterion, wherein at least a high concentration of impurities accumulates in a first fraction and no impurities or at least a lower concentration of impurities than in the case of the first fraction accumulate in a second fraction, and wherein the fraction without (Continued)

impurities or with a low concentration of impurities forms the starting material for the manufacture of rare earth magnets.

10 Claims, 2 Drawing Sheets

(51) Int. Cl.
| | |
|---|---|
| *B22F 1/00* | (2022.01) |
| *B22F 9/04* | (2006.01) |
| *B23Q 7/12* | (2006.01) |
| *C22B 59/00* | (2006.01) |
| *H01F 1/057* | (2006.01) |
| *H01F 41/02* | (2006.01) |

(52) U.S. Cl.
CPC ............... *B23Q 7/12* (2013.01); *C22B 59/00* (2013.01); *H01F 1/057* (2013.01); *H01F 41/0253* (2013.01); *B03C 2201/20* (2013.01); *B22F 2009/041* (2013.01); *B22F 2998/10* (2013.01)

(58) Field of Classification Search
CPC ......... B03C 1/30; B03C 2201/20; B23Q 7/12; C22B 59/00; H01F 1/05; H01F 41/0253
See application file for complete search history.

(56) References Cited

U.S. PATENT DOCUMENTS

2014/0306044 A1* 10/2014 Guenter .................. B02C 23/12
241/42
2016/0001327 A1* 1/2016 Hagemeier ............ B02C 21/00
241/101.5

OTHER PUBLICATIONS

Classifying Milling Systems. "Cyclones and Cyclone Classifiers". 2021 (Year: 2021).*

* cited by examiner

METHOD AND PLANT FOR THE PRODUCTION OF A STARTING MATERIAL FOR THE PRODUCTION OF RARE EARTH MAGNETS

TECHNICAL FIELD

The present invention relates to a method for the production of a starting material for the production of a rare earth magnet according to the features of the claims, as well as a plant for the production of a starting material for the production of rare earth magnets according to the features of the claims.

BACKGROUND

A permanent magnet is a piece of a magnetizable material, for example iron, cobalt or nickel, which maintains a static magnetic field, without requiring an electrical current flow, in contrast to electromagnets. A permanent magnet can be created by the impact of a magnetic field on ferromagnetic material.

A group of permanent magnets, which essentially consist of iron metals (iron, cobalt, more rarely nickel) and rare earth metals (in particular neodymium, samarium, praseodymium, dysprosium, terbium, and gadolinium), is combined under the name rare earth magnet. Rare earth magnets are characterized in that they have a high magnetic remanence flux density and thus a high magnetic energy density.

For the production of a starting material, which is required for the manufacture of permanent magnets, in particular of Nd—Fe—B (neodymium-iron-boron) magnets, it is known in the prior art to produce alloys comprising rare earth metal to a powdery intermediate product, for example, in the form of coarse powder or fine powder. The conventional comminution technologies are generally suitable for the production of powdery intermediate products.

For example, mechanical comminution plants and/or the hydrogen technology are used for the coarse comminution or for the production of coarse powder, respectively, with a particle size of approximately 100 µm to 300 µm.

Grinding plants for fine grinding, such as, for example, fluidized bed jet mills or similar grinding plants, which are operated under protective gas, are used for the fine grinding or to produce fine powder, respectively, with a particle size of approximately 0.1 µm to 20 µm. The used protective gas is usually nitrogen or argon.

Due to the fact that the occurrence of rare earth metals is limited, old magnets, which are reused and/or recycled for the production of a starting material for the manufacture of rare earth magnets, in addition to alloys comprising rare earth metal, are also becoming increasingly important for the production of a starting material for the manufacture of rare earth magnets. The old magnets are, for example, old magnets, which were used in motors or in electrical appliances or the like and which are no longer needed, respectively, and which do not and/or no longer completely fulfill their desired properties and/or desired performance. When using old magnets, this is accordingly also referred to as a recycling material.

In contrast to alloys comprising rare earth metal, an old magnet or such a recycling material, respectively, has a higher concentration of unwanted impurities. These impurities are mostly non-metallic impurities, such as, for example, oxygen, nitrogen and carbon, which were enclosed in the material and/or absorbed due to their reaction with the environment as well as due to previous production processes or the like.

The starting materials for the manufacture of rare earth magnets, which are produced by means of the comminution process from old magnet or recycling material, respectively, thus have unwanted impurities, such as, for example, oxygen, nitrogen, carbon, and the compounds thereof, by means of which the properties of the rare earth magnets, which are produced from the starting material, are significantly impacted, for example, with regard to the attainable magnetic strength (remanence) as well as the opposing field stability. The impurities also contribute to a significantly poor corrosion behavior, for example, in wet conditions and in moist air.

To decrease the unwanted impurities and to produce a rare earth magnet comprising desired properties, it is thus known in the prior art to combine powders produced from old magnets with powder from alloys comprising rare earth metal.

A method for the recycling of old magnets for the production of rare earth magnets, in particular of Nd—Fe—B magnets is known from WO 2014/205002 A2, in the case of which a pre-treatment of the old magnet, which is to be recycled, such as, for example, demagnetization as well as temperature loading (heating and cooling down), initially takes place in numerous method steps. After conclusion of the preparation, the comminution of the pre-treated old magnet into a powder takes place and a subsequent mixing of the produced powder with the powder of a rare earth metal into a homogenous mixture, which represents the starting material for the manufacture of rare earth magnets.

Due to the fact that in addition to old magnets, an alloy comprising rare earth metal is also required for the production of a starting material for the manufacture of rare earth magnets comprising desired properties, the method for the production of starting materials for the manufacture of rare earth magnets as described by the WO publication is expensive. There is also a dependency here again on alloys comprising rare earth metal, which are generally rare and expensive.

A method for the separation of rare earth metal particles from a mixture containing rare earth metal is known from WO 2014/154517 A1. To form a particle mixture containing rare earth metal particles, the mixture containing rare earth metal is initially comminuted. At least one measure for the demagnetization of the rare earth metal particles in the particle mixture and a separation of the demagnetized rare earth metal particles from the particle mixture take place subsequently. The demagnetization and the subsequent magnetization of the rare earth metal particles as well as the separation of the demagnetized rare earth metal particles require numerous complex method steps, which have proven to be disadvantageous and complex in the prior art and in practice.

A method for the reclaiming of neodymium oxide from a starting mixture, in particular scrap, is disclosed by WO 2014/033004 A1. After pre-comminution of the starting mixture, which is to be recycled, a hydrometallurgical breakdown process takes place by adding acid, while the released volumetric flow rate of hydrogen is simultaneously determined. For the enhancement of the neodymium concentration of a fraction containing neodymium, a classification of portions of the starting mixture can be carried out prior to carrying out the hydrometallurgical breakdown process, whereby the separation of smaller, relatively isotropic Nd—Fe—B fragments are separated from larger portions, which appear in the starting mixture. Optionally, at least one magnetic separation can also be carried out, in order to separate all ferromagnetic as well as ferrimagnetic materials.

The solution disclosed in the WO application, however, has proven to be disadvantageous insofar as the addition of acid and/or of further liquids/chemicals and/or salts, or the like as well as the supply of temperature are required, whereby the method has proven to be complex, complicated and to be expensive.

SUMMARY

The invention is based on the object of providing a method for the production of a starting material for the manufacture of rare earth magnets, by means of which the impurities comprised in the powdery intermediate product can be at least largely decreased and/or reduced in a simple manner and by means of which an optimized starting material for the production of improved rare earth magnets is provided. The method for the production of a powdery starting material for the production of rare earth magnets is to simultaneously be improved. A plant for the production of a starting material for the manufacture of rare earth magnets is further provided, by means of which the method for the production of a starting material for the production of a rare earth magnet can be carried out in a simple manner.

These objects are solved by means of a method comprising the features in the invention, as well as by means of a plant comprising the feature in the invention. Further advantageous embodiments and further developments of the invention are specified in the respective dependent claims.

To solve the above-mentioned objects, the invention proposes a method for the production of a powdery starting material, which is provided for the manufacture of rare earth magnets.

In a first step, at least one magnetic material and/or at least one alloy comprising rare earth metal is provided, which each comprise a low concentration, in particular an unwanted, but unavoidable and non-negligible concentration of impurities. The at least one magnetic material is preferably an old magnet or old magnets, which was/were used, for example, in motors and/or in electrical appliances and in each case no longer has/have value there for a further use. The at least one magnetic material or the old magnet, respectively, is preferably a Nd—Fe—B (neodymium-iron-boron) magnet. The impurities can be, for example, oxygen, carbon and/or nitrogen, oxygen-, carbon-, and/or nitrogen-containing compounds or similar impurities, which are contained in the respectively provided materials. Frequent impurities are formed by compounds of oxygen, carbon and/or nitrogen with neodymium, in sintered magnets, the oxygen is usually bound, for example, in the form of neodymium oxide $Nd_2O_3$, the nitrogen in the form of neodymium nitride NNd, and the carbon in the form of neodymium-carbide, $Nd_xC_y$. Oxygen-nitrogen-containing impurities can furthermore be contained, for example, in the form of neodymium-III-nitrate $Nd(NO_3)_3$. Impurities by hydrogen, hydrogen-containing compounds or the like would further also be conceivable. The low concentration of impurities in the provided at least one magnetic material and/or in the provided at least one alloy comprising rare earth metal can be between at least 0.1 percent by weight and maximally 1.5 percent by weight.

According to an exemplary embodiment, the concentration of impurities of oxygen can, for example, in particular be between 0.1 percent by weight and 1.0 percent by weight, of nitrogen in particular between 0.01 percent by weight and 0.1 percent by weight, and of carbon in particular between 0.01 percent by weight and 0.15 percent by weight.

In a next step, a comminution of the provided at least one magnetic material and/or of the provided at least one alloy comprising rare earth metal takes place, wherein a powdery intermediate product is created from the at least one magnetic material and/or from the at least one alloy comprising rare earth metal, which intermediate product can possibly also contain an increased concentration of impurities than the provided at least one magnetic material and/or than the provided at least one alloy comprising rare earth metal. The increased concentration of impurities in the powdery intermediate product can preferably be between at least 0.01 percent by weight and maximally 2.0 percent by weight.

According to an exemplary embodiment, the concentration of impurities in the powdery intermediate product of oxygen can, for example, in particular be between 0.1 percent by weight and 1.2 percent by weight, of nitrogen in particular between 0.01 percent by weight and 0.15 percent by weight, and of carbon in particular between 0.01 percent by weight and 0.20 percent by weight.

By means of the comminution of the at least one magnetic material and/or of the at least one alloy comprising rare earth metal, impurities, such as oxygen, carbon, nitrogen, and/or hydrogen or corresponding oxygen-, carbon-, nitrogen-, and/or hydrogen-containing compounds, etc., can additionally be absorbed from the environment by the material, which is to be comminuted, which causes a rise of the concentration of impurities in the powdery intermediate product as compared to the provided at least one magnetic material and/or of the at least one alloy comprising rare earth metal.

A classification of the powdery intermediate product to at least one criterion takes place in a further step, wherein, for the classification of the powdery intermediate product with impurities, at least one dynamic classifier is provided, which divides the powdery intermediate product with impurities into at least two fractions based on the at least one criterion, wherein a high concentration of impurities accumulate in a first fraction and no impurities or at least a lower concentration of impurities than in the case of the first fraction accumulate in a second fraction. Even though the classification of the powdery intermediate product can have the result that the concentration of impurities as a whole increases, the percentage of impurities can be separated into the at least two fractions via the classification in such a way that the percentage of absorbed impurities and the other impurities absorbed in the respective powdery intermediate product can be sorted out via the at least two fractions.

The concentration of impurities in the first fraction can be between at least 0.02 percent by weight and maximally 10.0 percent by weight. According to an exemplary embodiment, the concentration of impurities of oxygen can, for example, in particular be between 0.5 percent by weight and 8.0 percent by weight, of nitrogen in particular between 0.05 percent by weight and 0.35 percent by weight, and of carbon in particular between 0.05 percent by weight and 0.35 percent by weight.

The concentration of impurities in the second fraction can be maximally 1.0 percent by weight. According to an exemplary embodiment, the percentage of impurities in the second fraction of oxygen can lie at/be, for example, 0.01 percent by weight or less than maximally 0.2 percent by weight, of nitrogen 0.01 percent by weight or less than maximally 0.05 percent by weight, and of carbon 0.01 percent by weight or less than maximally 0.05 percent by weight.

The fraction, in particular the second fraction, without impurities or with the low concentration of impurities, forms the starting material for the manufacture and/or production of rare earth magnets.

The classification of the powdery intermediate product by means of the dynamic classifier into at least two fractions can also be referred to as dynamic classifier process.

It can be provided that the at least one criterion is defined by the physical property of the particle size or the like. All further criteria, such as, for example, particle density, can optionally be suitable for the classification of the powdery intermediate product into at least two fractions.

According to preferred exemplary embodiments of the invention, the first fraction with a high concentration of impurities is formed by a small particle size, and the second fraction without impurities or with a low concentration of impurities is formed by a larger particle size than in the case of the first fraction.

The powdery intermediate product, in particular in each case the second fraction without impurities or with the low concentration of impurities can be classified repeatedly by means of the dynamic classifier and can be divided into at least two fractions. The impurities, which are present in the powdery intermediate product, can be sorted out successively in this way via the at least two fractions and can thus be decreased, in order to provide a starting material for the manufacture of rare earth magnets without impurities or with a concentration of impurities, which is as low as possible. A homogenous material, for example, with regard to the particle size, can also be obtained by means of the repeated classifier processes. The classification by means of the dynamic classifier can be repeated any number of times, whereby an at least largely homogenous starting material can thereby be produced for the manufacture of rare earth magnets.

It can be provided that the concentration of impurities of the second fraction is decreased by at least one-fourth to at least three-fourths or more as compared to the first fraction by classifying the powdery intermediate product into the at least two fractions. The impurities can optionally be separated completed from the second fraction.

Depending on the exemplary embodiment of the invention, it can be provided that the at least one magnetic material and/or the at least one alloy comprising rare earth metal is comminuted in such a way that the produced powdery intermediate product is a coarse powder or a fine powder. A differentiation can be made between a coarse grinding and a fine grinding in this respect.

The comminution of the at least one magnetic material and/or of the at least one alloy comprising rare earth metal, in particular into a coarse powder, can take place by means of a grinding process or by means of a plurality of grinding processes of a mechanical grinding plant or with the help of the hydrogen technology, wherein the addition of hydrogen can cause an embrittlement of the at least one magnetic material and/or of the at least one alloy comprising rare earth metal.

If a coarse grinding is carried out and the powdery intermediate product is thus a coarse powder, the classification can be carried out by means of the dynamic classifier with the coarse-grained powdery intermediate product, which the coarse-grained powdery intermediate product can be divided into at least two fractions according to at least one criterion. It can be provided that the fraction without impurities or with the low concentration of impurities is subjected to a further comminution after conclusion of the classification, so that a fine powder is produced and provided as starting material for the production of the rare earth magnet. Immediately after the classification by means of the dynamic classifier into the at least two fractions, the coarse powder can optionally serve as starting material for the production of the rare earth magnet, wherein, in particular the fraction without impurities or with the lower concentration of impurities, serves as starting material for the manufacture of the rare earth magnet.

Subsequent to the coarse grinding, a fine grinding can optionally be carried out by means of a grinding process or by means of a plurality of grinding processes of a mechanical grinding plant, so that from the previously provided at least one magnetic material and/or at least one alloy comprising rare earth metal, a fine-grained powdery intermediate product is created, which is subsequently classified into at least two fractions according to at least one criterion by means of the dynamic classifier.

It can be provided that protective gas is supplied to the at least one dynamic classifier, so that the powdery intermediate product is divided into at least two fractions under protective gas atmosphere. The used protective gas can be, for example, helium, argon, nitrogen, or similar protective gases.

Temporally before or during the comminution, at least one excipient in solid, liquid or gaseous state can additionally be supplied to the at least one provided magnetic material and/or to the at least one alloy comprising rare earth metal. The at least one excipient can comprise, for example, zinc stearate, isopropanol or the like.

The at least one excipient can contribute to the fact that no or fewer impurities are absorbed by the at least one magnetic material and/or the provided at least one alloy comprising rare earth metal during the comminution of the provided at least one magnetic material and/or the provided at least one alloy comprising rare earth metal, so that the concentration of impurities as compared to the provided at least one magnetic material and/or the provided at least one alloy comprising rare earth metal does not increase or increases only insignificantly. The at least one excipient can place itself around the individual particles of the respective material like a coating, so that the concentration of impurities in the powdery intermediate product does not increase or increases only slightly.

The invention further relates to a plant for the production of a powdery starting material, which is provided for the manufacture of rare earth magnets, in particular according to a method according to the claims. The plant comprises at least one comminution apparatus, which produces a powdery intermediate product by comminuting at least one magnetic material and/or at least one alloy comprising rare earth metal. The at least one comminution apparatus can be mechanical comminution machines, each of which can produce a powdery intermediate product with an increased concentration of impurities. The comminution apparatus can optionally be a device, which can produce the provided at least one magnetic material and/or at least one alloy comprising rare earth metal into a powdery intermediate product with the help of the hydrogen technology.

The plant further comprises at least one separating apparatus, which is embodied for the classification of the powdery intermediate product according to at least one criterion. The at least one separating apparatus can be embodied by means of a dynamic classifier, which can divide the powdery intermediate product with the impurities into at least two fractions based on the at least one criterion, wherein a first fraction comprises a high concentration of impurities and a second fraction does not comprise any impurities or a lower concentration of impurities than the first fraction. The second fraction without impurities or with a low concentration of impurities forms the starting material for the manufacture of rare earth magnets.

The at least one criterion for the classification of the powdery intermediate product can comprise the particle size, the particle density or the like, of the powdery intermediate product.

According to an exemplary embodiment of the invention, the at least one separating apparatus can comprise at least one dynamic classifier, which is integrated in the plant. The at least one separating apparatus, which is embodied as separate component part with respect to the plant and to which the powdery intermediate product, which is to be classified, is supplied, can optionally comprise at least one dynamic classifier.

It can further be provided that at least one protective gas is supplied to the dynamic classifier, so that the classification, which is directed to at least one criterion, takes place under protective gas atmosphere. The used protective gas can be, for example, helium, argon, nitrogen, or similar protective gases.

At least one excipient in solid, liquid or gaseous state can further be supplied to the at least one comminution apparatus, in order to be able to at least largely suppress unwanted reactions of the produced powdery intermediate product with the environment.

The impurities can be non-metallic substances, such as, for example, oxygen, carbon or nitrogen, and/or the compounds thereof. Impurities, such as hydrogen, the compounds thereof or similar impurities would further also be conceivable.

With regard to all above-mentioned aspects and embodiment alternatives of the method according to the invention for the production of a powdery starting material, which is provided for the manufacture of rare earth magnets, it is important to mention at this point that these aspects and characteristics can equally be part of the plant according to the invention for the production of a powdery starting material, which is provided for the manufacture of rare earth magnets, or can be applied to them. When certain aspects and alternatives of the method for the production of a powdery starting material, which is provided for the manufacture of rare earth magnets, are thus mentioned at any point in the above description, these aspects and embodiment alternatives are to equally be read on plants according to the invention, and are to also be understood in this way.

BRIEF DESCRIPTION OF THE DRAWINGS

Exemplary embodiments of the invention and the advantages thereof will be described in more detail below on the basis of the enclosed Figures. The size ratios of the individual elements to one another in the Figures do not always correspond to the actual size ratios, because some shapes are illustrated in a simplified manner and other shapes are illustrated in an enlarged manner in comparison with other elements for better visualization.

DETAILED DESCRIPTION

Figure 1:
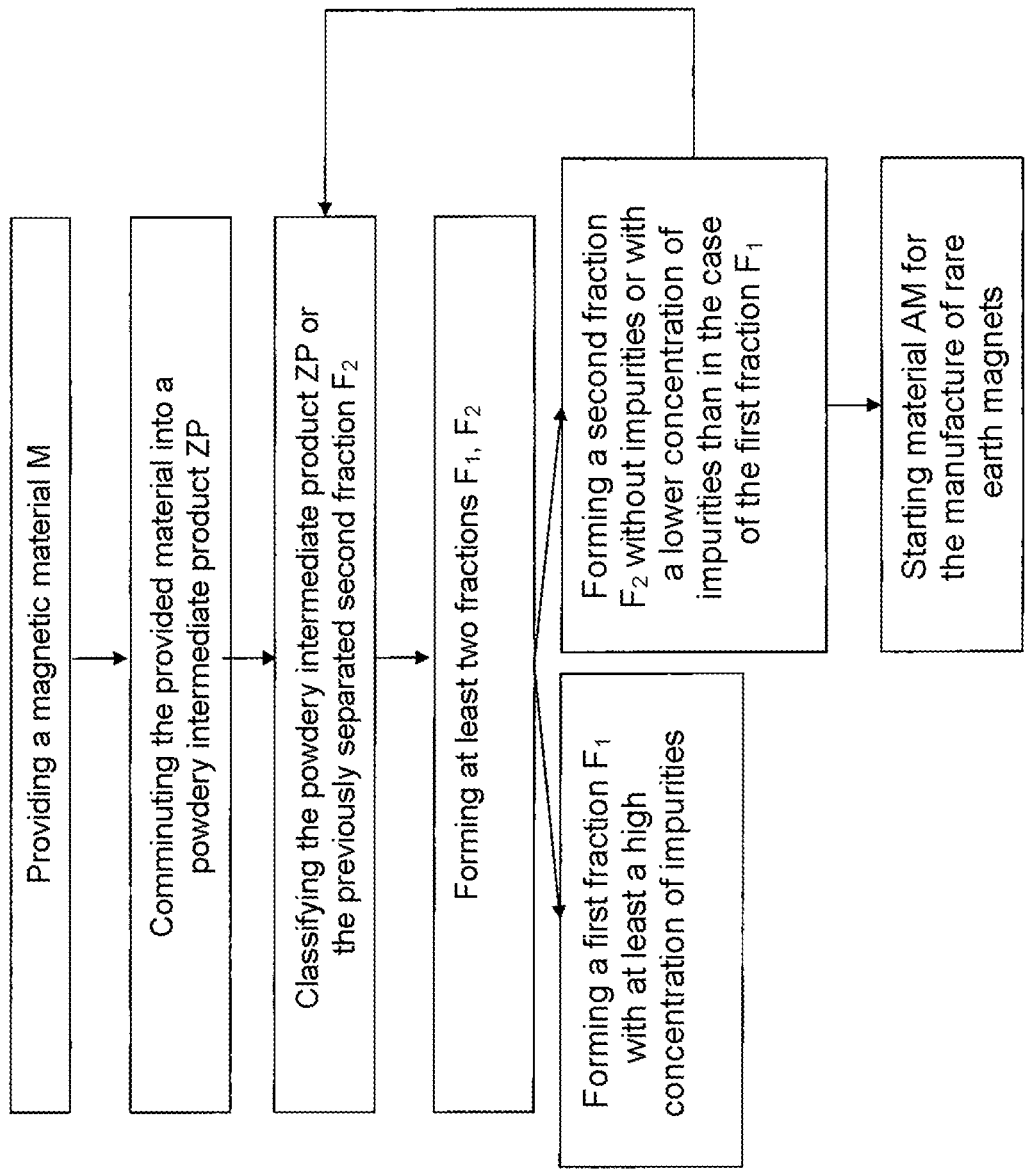
FIG. 1 clarifies individual steps for the implementation of an embodiment of a method according to the invention.

Identical reference numerals are used for elements of the invention, which are identical or which have identical effects. For better visualization, only reference numerals, which are required for the description of the respective Figure, are furthermore illustrated in the individual Figures. The illustrated embodiments only represent examples for how the method according to the invention and the plant according to the invention can be embodied and do not represent a conclusive limitation.

FIG. 1 shows individual method steps for the production of a starting material AM for the manufacture of rare earth magnets, based on at least one magnetic material M.

In a first step, at least one magnetic material M is provided. The at least one magnetic material M is preferably old magnets, in particular Nd—Fe—B old magnets, which were used in motors or in old electrical appliances or the like. Such old magnets generally comprise low, in particular an unwanted, but unavoidable and non-negligible concentration of impurities, which are contained in the respective magnetic material M and/or are enclosed in the respective material. These impurities are preferably oxygen, carbon, nitrogen, and/or the compounds thereof. The low concentration of impurities in the provided at least one magnetic material and/or in the provided at least one alloy comprising rare earth metal preferably lies between at least 0.01 percent by weight and maximally 1.5 percent by weight. For example, the concentration of impurities of oxygen can in particular be between 0.1 percent by weight and 1.0 percent by weight, of nitrogen between 0.01 percent by weight and 0.1 percent by weight, and of carbon between 0.01 percent by weight and 0.15 percent by weight.

In a next step, the provided at least one magnetic material M is comminuted, wherein a powdery intermediate product ZP, which may also contain an increased concentration of impurities than the provided at least one magnetic material M, is created from the at least one magnetic material M. The increased concentration of impurities in the powdery intermediate product preferably lies between at least 0.01 percent by weight and maximally 2.0 percent by weight. For example, the concentration of impurities of oxygen can in particular be between 0.1 percent by weight and 1.2 percent by weight, of nitrogen between 0.01 percent by weight and 0.15 percent by weight, and of carbon between 0.01 percent by weight and 0.20 percent by weight.

By means of the comminution of the at least one magnetic material M, the latter generally absorbs additional impurities, such as oxygen, carbon, nitrogen, and/or the compounds thereof from the environment, which causes an increase of the concentration of impurities in the powdery intermediate product ZP as compared to the provided at least one magnetic material M. Oxygen is in particular increasingly absorbed, because the at least one magnetic material is stirred up by means of the comminution and is thrown around inside the comminution apparatus.

The comminution of the at least one magnetic material M thereby takes place in such a way that a coarse powder or fine powder is produced, which forms the powdery intermediate product ZP.

A comminution process by means of a mechanical comminution plant or the use of hydrogen, which causes an embrittlement of the at least one magnetic material M and thus a break-up of the at least one magnetic material M into coarse-grained powdery intermediate product, is optionally suitable for the production of a coarse powder. With the use of hydrogen, the powdery intermediate product ZP also has, in addition to impurities, such as oxygen, carbon, nitrogen, and/or the compounds thereof, an increased concentration of impurities of hydrogen and/or hydrogen-containing compounds.

A plurality of comminution processes, in particular a plurality of grinding processes and/or a fine grinding of the at least one magnetic material M can be carried out for the production of fine-grained powdery intermediate product ZP, wherein an increased concentration of unwanted impurities, such as oxygen, carbon, nitrogen, and/or the compounds thereof, is then usually present in the powdery intermediate product ZP.

Due to the fact that, if possible, no or a low concentration of impurities should be present in the respective starting material AM for the provision of a starting material AM for the manufacture of a rare earth magnet, these impurities have to be separated from the powdery intermediate product ZP. For this purpose, a classification of the powdery intermediate product ZP to at least one criterion takes place in a next step, wherein the concentration of impurities can possibly increase further due to the classification. A high increase of oxygen preferably takes place, because the powdery intermediate product ZP is stirred up as part of the classification. The at least one criterion can comprise the particle size, the particle density or the like, wherein in the case of the method according to the invention, a classification of the powdery intermediate product ZP preferably takes place according to the particle size.

The classification of the powdery intermediate product ZP takes place by means of at least one dynamic classifier, which divides the produced powdery intermediate product into at least two fractions $F_1$, $F_2$ based on the at least one criterion, in particular based on the particle size, wherein at least a high concentration of impurities accumulates in a first fraction $F_1$ and no impurities or at least a lower concentration of impurities than in the first fraction $F_1$ accumulates in a second fraction $F_2$. The first fraction $F_1$ with a high concentration of impurities is preferably formed by a small particle size and the second fraction $F_2$ without impurities or with a lower concentration than in the case of the first fraction $F_1$ is formed by a larger particle size of the classified powdery intermediate product ZP. The concentration of impurities in the first fraction preferably lies between at least 0.02 percent by weight and maximally 10.0 percent by weight. The concentration of impurities of oxygen, for example, can in particular be between 0.5 percent by weight and 8.0 percent by weight, of nitrogen between 0.05 percent by weight and 0.35 percent by weight, and of carbon between 0.05 percent by weight and 0.35 percent by weight.

The concentration of impurities in the second fraction is preferably 0.00 percent by weight, maximally 1.0 percent by weight. The concentration of impurities in the second fraction of oxygen can in particular be 0.01 percent by weight or less than maximally 0.2 percent by weight, of nitrogen 0.01 percent by weight or less than maximally 0.05 percent by weight, and of carbon 0.01 percent by weight or less than maximally 0.05 percent by weight.

Due to the fact that no impurities or only a lower concentration of impurities than in the case of the first fraction $F_1$ with the smaller particle size accumulates in the second fraction $F_2$ with the larger particle size, the material separated in the second fraction $F_2$ forms the starting material AM for the manufacture of rare earth magnets. In contrast, the first fraction $F_1$ with the smaller particle size and the higher concentration of impurities is not of interest for the manufacture of a rare earth magnet and is not used further or is sorted out, respectively.

Even though further impurities, such as oxygen, nitrogen, carbon, and/or the compounds thereof, are absorbed by means of the classification of the powdery intermediate product ZP, these additionally absorbed impurities and the impurities, which are already present, are separated out and sorted out via the classification into the at least two fractions $F_1$, $F_2$, so that a second fraction $F_2$ without impurities or with a low concentration of impurities is created.

If the second fraction $F_2$ comprises a concentration of impurities, which is still too high, after the first classification by means of the dynamic classifier, further dynamic classifier processes can be carried out by means of the dynamic classifier any number of times and/or repeatedly, so that a starting material AM can be produced and provided for the manufacture of rare earth magnets without or with a concentration of impurities, which is as low as possible. The first fraction $F_1$ with the high concentration of impurities as compared to the second fraction $F_2$ is in each case sorted out for the further classifier processes, while the second fraction $F_2$ in each case serves for the further classification into at least two further fractions.

To avoid unwanted reactions of the powdery intermediate product ZP with the environment and/or the like, at least one protective gas can be supplied to the dynamic classifier, so that the powdery intermediate product ZP is divided into at least two fractions $F_1$, $F_2$ under protective gas atmosphere.

At least one excipient in solid, liquid or gaseous state can optionally be supplied to the at least one magnetic material M. The at least one excipient can be, for example, zinc stearate, isopropanol or the like, which places itself around the individual particles of the respective material like a coating and thus decreases the absorption of impurities during the comminution of the at least one magnetic material M into a powdery intermediate product ZP.

Figure 2:
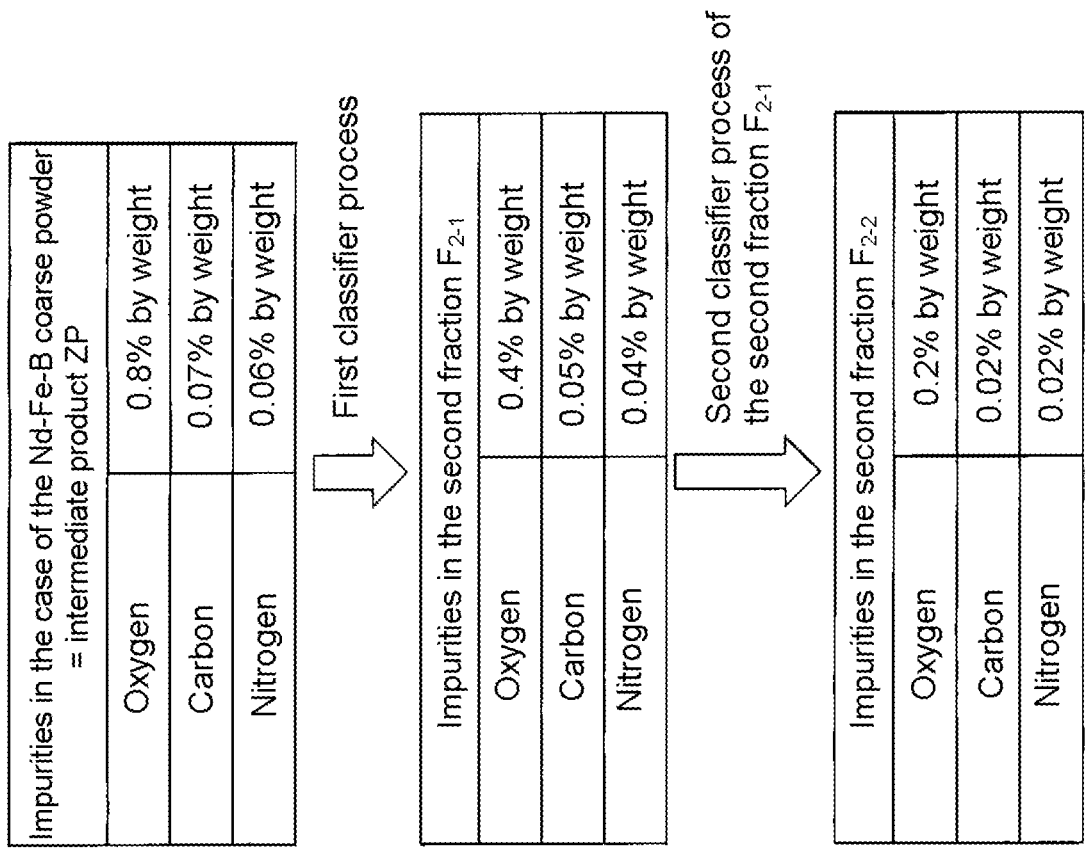
FIG. 2 shows the concentration of impurities of the powdery intermediate product after a coarse grinding and in each case after two classifier processes in a tabular comparison.

FIG. 2 shows the concentration after a coarse grinding of a magnetic material as well as after two classifier processes of an exemplary embodiment of the invention in a schematic manner and in a tabular overview.

In the case of the exemplary embodiment at hand, a coarse powder was created from a magnetic material M, in particular from an Nd—Fe—B old magnet, with the help of the hydrogen technology, wherein the supplied hydrogen penetrates into the provided Nd—Fe—B old magnet, so that the latter breaks up into a coarse powder with a fineness of zero to approximately 300-3000 μm. The produced coarse powder is thus the powdery intermediate product ZP.

The produced coarse-grained powdery intermediate product ZP comprises impurities, such as oxygen and/or oxygen-containing compounds with, for example, 0.8 percent by weight of oxygen, carbon and/or carbon-containing compounds with, for example, 0.07 percent by weight of carbon as well as nitrogen and/or nitrogen-containing compounds with, for example, 0.06 percent by weight of nitrogen.

To decrease the concentration of impurities in the powdery intermediate product ZP of the comminuted Nd—Fe—B old magnet, the powdery intermediate product ZP is classified to at least one criterion, in particular to its particle size. At least one dynamic classifier, which divides the powdery intermediate product ZP comprising the oxygen-, carbon-, and nitrogen-containing impurities into at least two fractions $F_{1-1}$ (not illustrated), $F_{2-1}$, based on the particle size, is provided for the classification.

The at least two fractions $F_{1-1}$, $F_{2-1}$ differ in that at least a high concentration of impurities accumulates in a first fraction $F_{1-1}$ with a small particle size, and at least a lower concentration of impurities than in the case of the first fraction $F_{1-1}$ accumulates in a second fraction $F_{2-1}$ with a larger particle size.

After a first classifier process, the percentage of oxygen has thus decreased to 0.4 percent by weight, of carbon to 0.05 percent by weight, and of nitrogen to 0.04 percent by weight, wherein this information is the concentration of impurities in the second fraction $F_{2-1}$ with the larger particle size. The concentration of impurities could thus be decreased by at least one-fourth and by half by means of the first classifier process in the second fraction $F_{2-1}$.

Due to the fact that the first fraction $F_{1-1}$ with the smaller particle size is characterized by a concentration of impurities, which is significantly higher as compared to the second fraction $F_{2-1}$, and is thus not relevant for the manufacture of rare earth magnets, said first fraction $F_{1-1}$ will not be discussed in more detail. It is also important to mention at this point that hydrogen impurities, which result from the coarse grinding, will not be discussed in more detail.

Due to the fact that a starting material AM with or without a lower concentration of impurities is desirable, if possible, a second classifier process of the previously separated second fraction $F_{2-1}$ takes place so as to thus further decrease the concentration of impurities.

The material of the preciously separated second fraction $F_{2-1}$ is divided into at least two fractions $F_{1-2}$ (not illustrated), $F_{2-2}$ based on the particle size by means of another classification by means of at least one dynamic classifier, wherein at least a high concentration of impurities accumulates in a first fraction $F_{1-2}$ with a small particle size, and no impurities or at least a lower concentration of impurities than in the case of the first fraction $F_{1-2}$ accumulate in a second fraction $F_{2-2}$ with a large particle size. The second classifier process thus contributes to the fact that the percentage of oxygen is decreased to 0.2 percent by weight, of carbon to 0.02 percent by weight, and of nitrogen to 0.02 percent by weight in the second fraction $F_{2-2}$ in each case. The concentration of impurities could thus be decreased by at least one-fourth and by half by means of the second classifier process.

To further decrease the concentration of impurities, classifier processes can be performed any number of times, so as to subsequently embody a fraction without impurities or with a lower concentration of impurities, which represents the starting material AM for the manufacture of rare earth magnets.

The invention has been described with reference to a preferred embodiment. It is conceivable for a person of skill in the art, however, that modifications or changes can be made to the invention, without thereby leaving the scope of protection of the following claims.

The invention claimed is:

1. A method for the production of a powdery starting material, which is provided for the manufacture of rare earth magnets, comprising the following steps:
providing at least one magnetic material and/or at least one alloy comprising rare earth metal, which includes a low concentration of impurities,
comminuting the provided at least one magnetic material and/or the provided at least one alloy including rare earth metal, wherein a powdery intermediate product is created from the at least one magnetic material and/or from the at least one alloy including rare earth metal, the intermediate product can contain an increased concentration of impurities than the provided at least one magnetic material and/or than the provided at least one alloy including rare earth metal,
classifying the powdery intermediate product according to at least one criterion, wherein, for the classification of the powdery intermediate product, at least one dynamic classifier divides the powdery intermediate product into at least two fractions so that impurities are sorted out into a first fraction having at least a first concentration of impurities accumulated therein and a second fraction having no impurities or at least a second concentration of impurities accumulated therein, the second concentration being lower than the first concentration, and the first fraction with the first concentration of impurities is formed by a first particle size, and the second fraction with no impurities or with the second concentration of impurities is formed by a second particle size that is larger than the first particle size of the first fraction, wherein the classifying step is performed such that the first concentration of impurities is provided between 0.02 and 10.0 percent by weight and the second concentration of impurities is provided less than 1.0 percent by weight;
wherein the step of classifying is performed without comminuting the second fraction,
wherein the second fraction forms the starting material for the manufacture of rare earth magnets.

2. The method according to claim 1, in which the at least one criterion is defined by the particle size, particle density or the like.

3. The method according to claim 1, in which the second concentration of impurities of the second fraction is decreased by at least one-fourth relative to the first fraction by classifying the powdery intermediate product into the at least two fractions.

4. The method according to claim 1, in which the at least one magnetic material and/or the at least one alloy comprising rare earth metal is comminuted in such a way that the produced powdery intermediate product is a coarse powder or a fine powder.

5. The method according to claim 1, in which the at least one dynamic classifier process takes place by means of the dynamic classifier on the coarse powder or on the fine powder.

6. The method according to claim 3, in which the at least one magnetic material and/or the at least one alloy comprising rare earth metal is comminuted in such a way that the produced powdery intermediate product is a coarse powder or a fine powder.

7. The method according to claim 4, in which the at least one dynamic classifier process takes place by means of the dynamic classifier on the coarse powder or on the fine powder.

8. The method according to claim 1, in which at least a protective gas is supplied to the at least one dynamic classifier, so that the powdery intermediate product is divided into the at least two fractions under protective gas atmosphere.

9. The method according to claim 1, in which, temporally before or during the comminution, at least one excipient in solid, liquid or gaseous state is supplied to the provided at least one magnetic material and/or to the provided at least one alloy comprising rare earth metal.

10. The method according to claim 3, in which the second concentration of impurities of the second fraction is decreased by at least three-fourths relative to the first fraction by classifying the powdery intermediate product into the at least two fractions.

* * * * *